United States Patent [19]
Larsen

[11] 3,874,691
[45] Apr. 1, 1975

[54] POWERED VEHICULAR IMPLEMENT STEERING TRAILER

[75] Inventor: Gregory J. Larsen, Claremont, Calif.

[73] Assignee: FMC Corporation, San Jose, Calif.

[22] Filed: June 14, 1975

[21] Appl. No.: 262,569

[52] U.S. Cl............................ 280/87.1, 280/112 A
[51] Int. Cl............................................. B62d 1/00
[58] Field of Search ... 280/87.1, 265, 266, 87.04 A, 280/47.11, 99, 112 A; 180/11, 12, 14 R; 15/49 R, 78, 87, 340

[56] References Cited
UNITED STATES PATENTS

| | | | |
|---|---|---|---|
| 225,760 | 3/1880 | Overstreet | 280/265 |
| 508,368 | 11/1893 | Chalk | 280/87.1 |
| 0,436,198 | 9/1890 | Walmet | 280/87.1 |
| 2,657,408 | 11/1953 | Machovec | 15/87 |
| 2,933,874 | 4/1960 | Sonmore et al. | 280/87.1 X |

FOREIGN PATENTS OR APPLICATIONS 1,029,590  5/1966  United Kingdom ............. 280/04 A Primary Examiner—Robert B. Reeves
Assistant Examiner—H. Grant Skaggs
Attorney, Agent, or Firm—C. E. Tripp

[57] ABSTRACT

The invention provides a trailer or sulky attachable to a wheeled vehicular implement steerable in response to movements of a trailer wheel laterally about its point of ground contact, the trailer having a draw bar connectable to the vehicle, a treadle supported by the draw bar and adapted to be foot actuated by the trailer operator, and means interconnecting the treadle and the trailer wheel to cause lateral oscillations of the wheel in response to actuations of the treadle.

8 Claims, 5 Drawing Figures

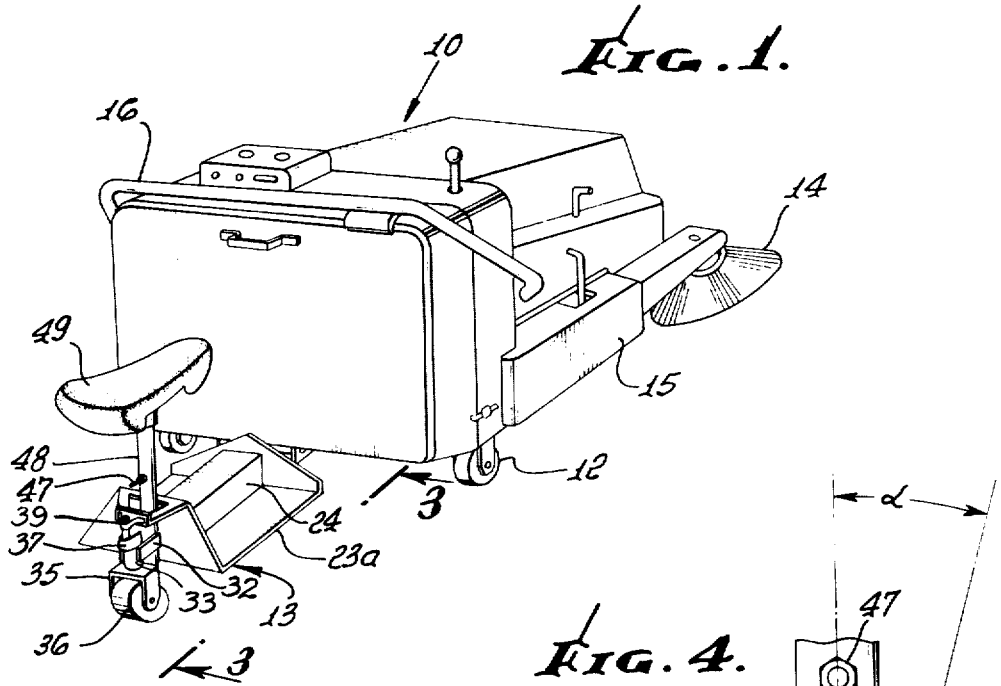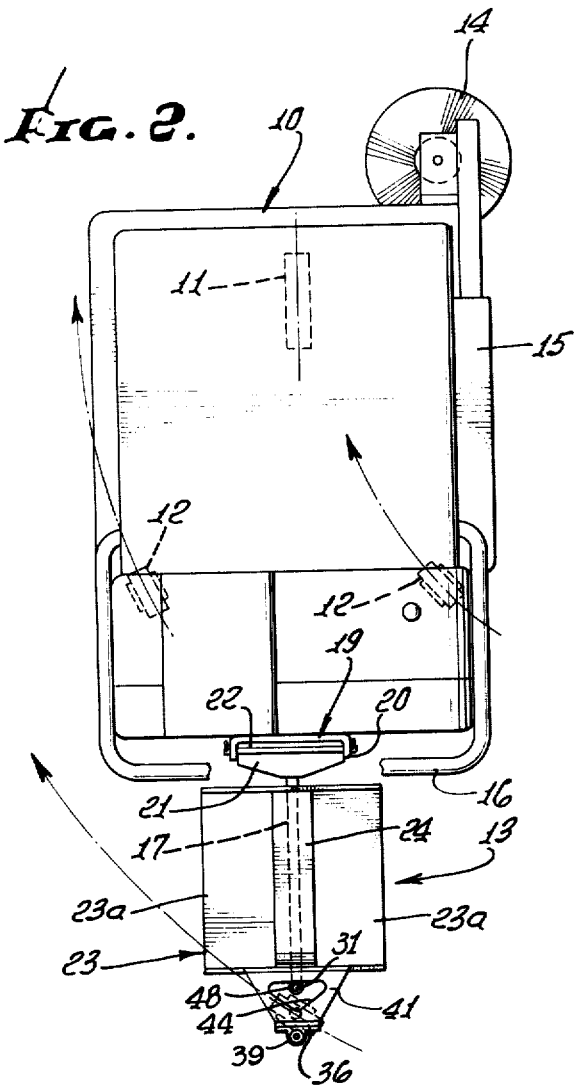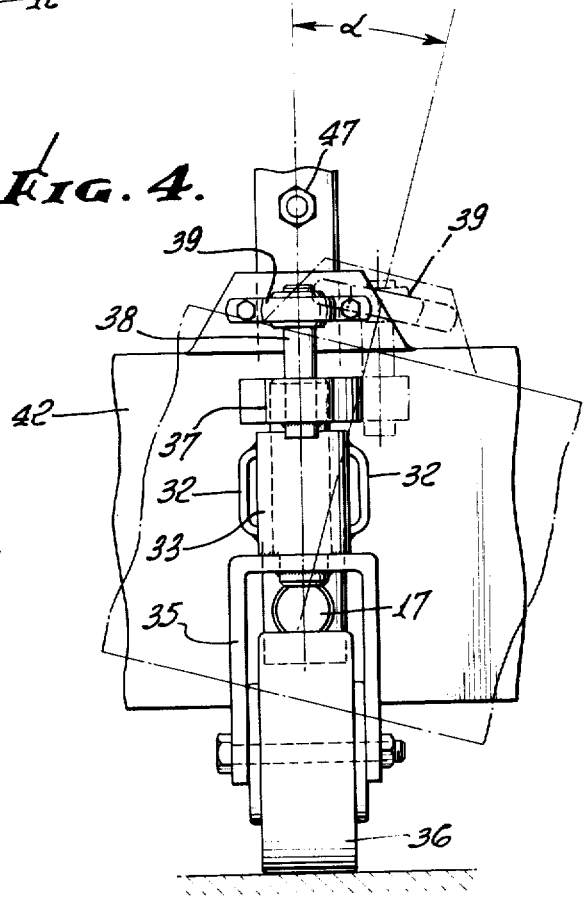

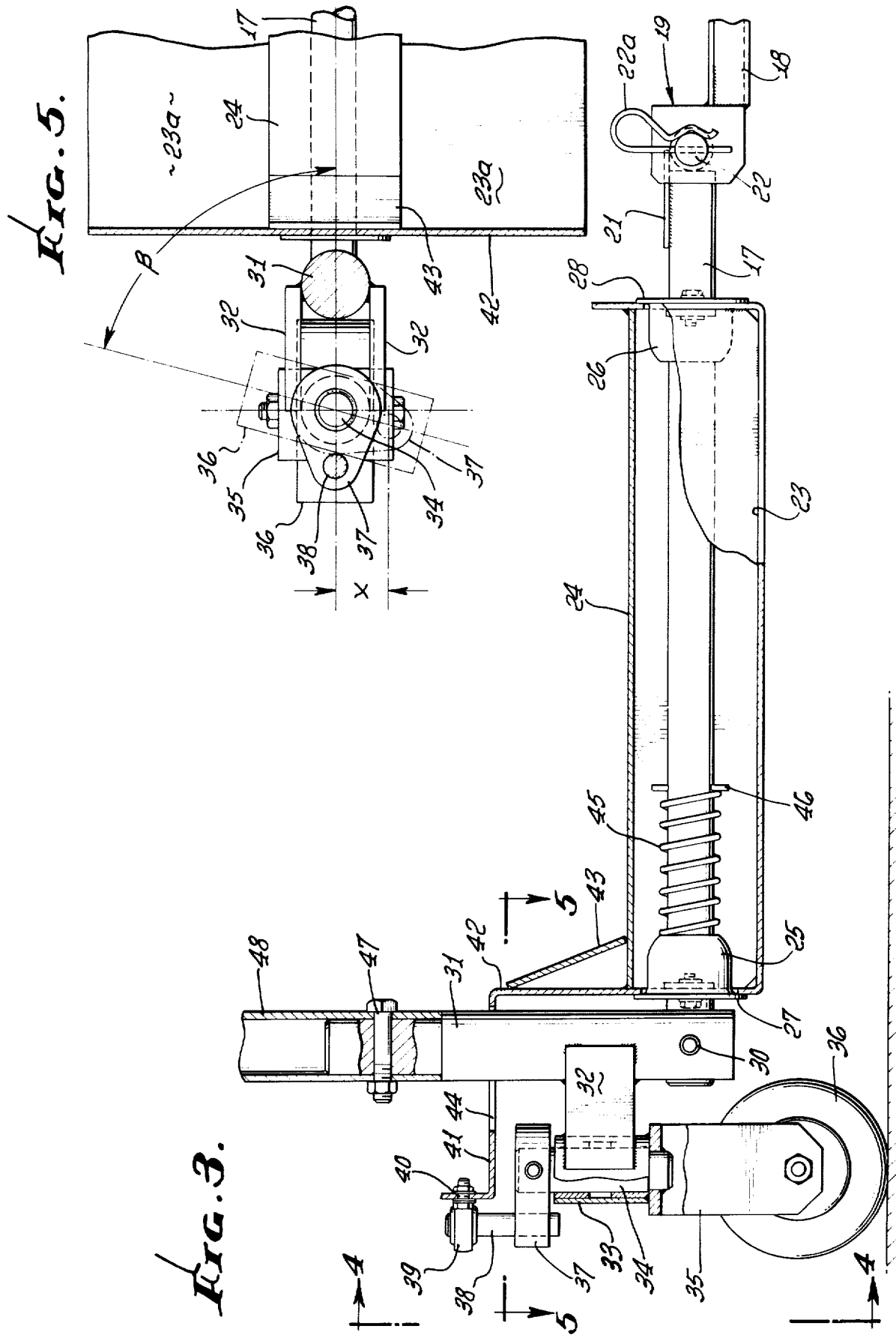

POWERED VEHICULAR IMPLMENT STEERING TRAILER

SUMMARY OF THE INVENTION

This invention relates to the conversion or adaptation of self-propelled implements such as powered sweepers, scrubbers, mowers, snow removal machines and the like normally of the walk-behind type, to rear steering by the operation of a small trailer coupled to the rear of the implement. Preliminarily it may be mentioned that implements capable of being steered in accordance with the invention are commonly known and may be characterized as having a forward power driven wheel and a pair of rear swivel caster wheels. The invention will be described in reference to the preferred, though typical, combination of a ground sweeper implement capable of being steered by the attached trailer.

Objectively the invention is designed to assure against a safety hazard existing in the known combination of a fixed front wheel driven, rear wheels castered implement, and a single axle trailer, the implement vehicle carrying a rear handle bar. Since the handle bar moves in respect to the operator when maneuvering, a danger exists in losing control, especially in short turns. Additionally, the combination is unstable when reversing with possible resultant "jack-knifing". The operator has little control in this condition and could be injured when pinched between the implement and its trailer.

Structurally the invention contemplates connection of the trailer draw bar to the implement vehicle by a suitable hitch construction permitting relative verticle swinging movements of the draw bar while preventing its lateral swinging movements, at least to a degree that could result in the stated condition of jack-knifing. Thus stabilized, the draw bar is adapted for connection with a single ground contacting wheel accommodated for bodily lateral turning movements, the effects of which are transmitted to the implement vehicle to effect its controlled steering. In operative association with the trailer wheel is means foot-controllable by the trailer operator for the transmission of steering movements to the wheel.

More particularly, the objects of the invention include mounting on the draw bar an operator-actuated foot treadle capable of oscillation laterally of the draw bar and whose movements are transmitted to the steering wheel by suitable connection, such as the later described parts interconnecting the treadle with a verticle wheel shaft journalled in a draw bar-supported bearing and responsive to actuations of the treadle.

As will later appear, different directional force transmissions occur within the range of treadle actuation of the trailer steering wheel. An additional object of the invention is to compensate for such force variations in the manner that will assure freedom of the parts for such relative movements and returnability of the threadle to its neutral position. This objective is achieved in a convenient and practical manner by mounting the treadle on the draw bar for movement longitudinally of the bar against the resistance of a spring acting to return the treadle to neutral position.

A further feature of the invention is the mountability on the trailer and above the treadle of a seat conveniently oriented for foot actuation of the treadle by the operator.

These as well as these and additional features and objects of the invention will be more fully understood from the following detailed description of the accompanying drawing in which:

BRIEF DESCRIPTION OF THE DRAWINGS

FIG. 1 is a showing in perspective of an illustrative sweeper implement and the attached trailer;

FIG. 2 is a plan view of FIG. 1;

FIG. 3 is an enlarged longitudinal view of the trailer including its hitch connection with the implement vehicle frame, certain of the parts appearing in cross section to illustrate interior constructions;

FIG. 4 is a fragmentary end elevation of the trailer as viewed from line 4—4 of FIG. 3; and FIG. 5 is a fragmentary plan taken on line 5—5 of FIG. 3.

DESCRIPTION OF THE PREFERRED EMBODIMENTS

Referring first to FIGS. 1 and 2, the sweeper vehicle generally indicated at 10 is of a known type having a power driven laterally stable front wheel 11 and a pair of rear caster wheels 12 which swivel in response to actuations of the latter described trailer generally indicated at 13. The sweeper vehicle mounts a side rotary sweeper broom 14 power driven through known transmission 15 by the sweeper engine. The sweeper 10 carries a handle 16 mounted to the sides of its body for up and down positioning to the convenience of the operator.

Trailer 13 has a generally T-shaped frame including a draw bar 17 connected to the implement frame 18, as illustrated in FIG. 3, by a hitch generally indicated at 19 permitting, as previously indicated, vertical but not lateral swinging movements of the draw bar relative to the frame. Typically the hitch 19 is shown (FIG. 2) to comprise a bracket plate 20 fixed to the sweeper frame and generally U-shaped to confine the draw bar terminal head plate 21 for pivoting on pine 22 having cotter 22a, thus to permit confined up and down swing of the draw bar relative to the frame.

The draw bar centrally mounts a treadle 23 presenting to the operator's feet flat plate extends 23a equidistant beyong the sides of the draw bar. Centrally between the extents 23a the draw bar is contained within the treadle-carried housing 24 the ends of which mount bearings 25 and 26 by attachment to the bearing flanges 27 and 28.

The rear end of the draw bar rigidly mounts as by fastener 30 an upstanding post 31 to which is fixed a bracket 32 welded to bearing 33 journaling shaft 34 extending up from the fork 35 of wheel 36. At its upper end shaft 34 mounts a lateral arm 37 connected by pin 38 to a universal or ball joint 39 attached at 40 to rear extension 41 of the treadle 23, the extension including portion 42 at the rear of guard 43. Opening 44 in the extension allows clearance from the post 31 within the swinging range of the treadle extension about and relative to the post.

Actuation of the treadle produces force transmission by way of the ball joint 39 from the treadle extension 41 to pin 38 with consequent swinging of the pin about the axis of shaft 34 and lateral tilting movement of the treadle extension. Under these conditions the treadle tends to become displaced longitudinally of the draw bar. The function of bearings 25 and 26 is to mount the treadle in a manner permitting such movement which however is resisted by coil spring 45 terminally confined between bearing 26 and a suitable abutment 46. Thus as the draw bar is longitudinally displaced within the bearings, the spring compresses and expands accordingly and to a degree corresponding to the extent of the bar displacement. Following treadle release from oscillations in either direction, the spring 45 acts to restore the treadle to what may be termed its neutral position of horizontality.

The operator may simply stand on the treadle or more conveniently be seated. For this purpose the post 31 mounts as by releasable attachment at 47 an additional post section 48 which carries the operator seat 49 as shown in FIG. 1.

In considering the operation of the implement trailer combination, for straightforward travel the implement wheels 11 and 12, also the trailer wheel 36 are positioned in parallel relation. Assuming the implement 10 is to be turned to the right, one side of treadle 23 is depressed for right turn the limit of which is approximated by the turned positions of the implement casters steering wheel as shown in FIG. 2 wherein the arrows also illustrate the arcuate turning directions and extends. At the illustrated turning limit the steering wheel 36 in its turning movement will have traversed the beta angle relative to the draw bar axis as shown in FIG. 5 and the actuating side of the treadle will have been depressed in correspondence with angle alpha as shown in FIG. 4. The force of spring 45 increases with increasing steering angles, and working along a simultaneously lengthing moment arm X effectively eliminates possible locking of the steering mechanism. And as previously indicated, following the described steering sequence the spring returns the treadle to neutral position.

I claim:

1. A trailer for attachment to a power driven wheeled vehicular implement said trailer comprising longitudinally extending drawbar means for connection to the implement, operator supporting means, a steerable wheel for supporting a rear portion of said drawbar means, and means for steering said wheel; the improvement wherein said operator supporting means comprises a foot treadle supported by said drawbar means for rocking motion of the treadle about a horizontal longitudinal axis by the operator, a rearwardly projecting treadle extension fixed to the treadle that rocks laterally with the treadle, and actuator means interconnecting said treadle extension and said trailer wheel for steering the wheel in response to rocking of said treadle, said treadle comprising a unitary member having a foot pedal on each side of said drawbar means.

2. The trailer of claim 1, wherein said drawbar means comprises a single longitudinally extending, shaft-like member supported by said wheel at one end and having means for attachment to the vehicular implement at its other end, said treadle being pivotally mounted on said longitudinally extending shaft-like member for motion about the axis of the member.

3. The trailer of claim 2, wherein said actuator means comprises crank means on said steerable wheel connected to said treadle extension, said treadle being slidably mounted on said longitudinally extending shaft-like member for longitudinal motion that accommodates swinging motion of said steering wheel crank means.

4. The trailer of claim 3, comprising spring means for resisting longitudinal motion of said treadle and operable to slidably restore the treadle to a normal, neutral position wherein said steerable wheel is in its straight ahead position.

5. The trailer of claim 4, wherein said spring means comprises a coil spring surrounding said shaft-like drawbar member that urges said treadle along said shaft-like member to position the steerable wheel in its straight ahead position.

6. The trailer of claim 3, comprising an upstanding post connected to the rear of said drawbar member, said steerable wheel being mounted on said post, said treadle extension having an opening through which said post extends with clearance that accommodates lateral rocking of the treadle extension.

7. The trailer of claim 6, comprising an operator's seat carried by said upstanding post.

8. A trailer for attachment to a power driven wheeled vehicular implement said trailer comprising drawbar means for connection to the implement, operating supporting means, a steerable wheel for supporting a rear portion of said drawbar means, and means for steering said wheel; the improvement wherein said operator supporting means comprises a foot treadle supported by said drawbar means for rocking motion of the treadle about a horizontal axis by the operator, a treadle extension fixed to the treadle that rocks laterally with the treadle, and actuator means interconnecting said treadle extension and said trailer wheel for steering the wheel in response to rocking of said treadle, said steerable wheel actuator means comprising a vertical shaft that mounts said steerable wheel and a crank arm on said shaft that extends longitudinally of said trailer when the steerable wheel is in its straight ahead position.

* * * * *